June 14, 1949.　　　M. B. HERBRICK　　　2,472,827
TIRE CHAIN RELEASE DEVICE
Filed Feb. 9, 1948

INVENTOR.
Milton B. Herbrick
BY
Sam J. Slotky
ATTORNEY

Patented June 14, 1949

2,472,827

UNITED STATES PATENT OFFICE 2,472,827

TIRE CHAIN RELEASE DEVICE

Milton B. Herbrick, Sterling, Colo.

Application February 9, 1948, Serial No. 7,145

2 Claims. (Cl. 152—213)

My invention relates to a tire chain device.

An object of my invention is to provide a release device which will allow a tire chain to be released from a tire, and whereby the inner side chain can be conveniently removed.

A further object of my invention is to provide means for releasing the inner chain in a simple arrangement which requires very few parts, and which works cooperatively with the end cross chain for allowing the releasing function.

A further object of my invention is to provide a device having the above characteristics which can be readily attached or detached.

Figure 1:
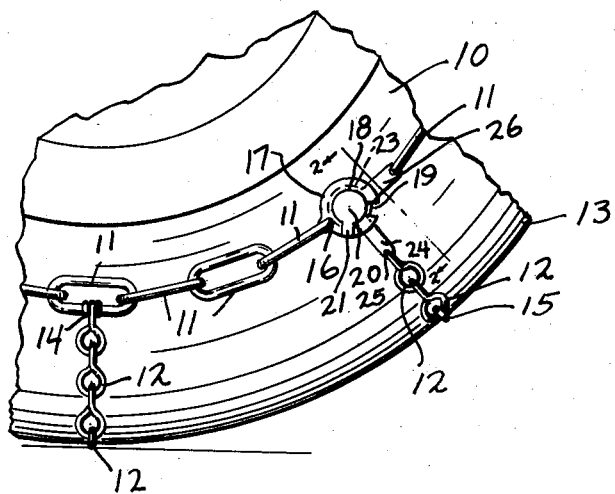
Figure 2:
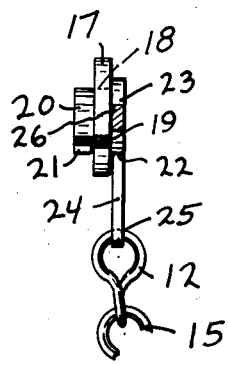

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of the releasing device as observed from the inside of a tire, and Figure 2 is an enlarged sectional detail taken along the lines 2—2 of Figure 1.

My invention contemplates a simple arrangement for detaching the inner, annular side chain of a tire chain arrangement, which arrangement is connected with one of the cross chains.

I have used the character 10 to designate the inner side wall of a tire casing, or the side which is facing away from the outside of the vehicle. I have further used the character 11 to designate a series of chain links which provide the inner side chain of the chain arrangement, and I have used the character 12 to designate the usual cross links which straddle the tire 13, such cross links being attached at 14 to either side, it being understood that a further series of links 11 are positioned on the outside of the tire. I have further used the character 15 to designate generally the end cross chains including the aforesaid twisted links 12. Cross chains 15 are attached at their outer ends to the commonly used ring or clamp, which provide attaching means for attachment to the end link 11 of the outside chain. This construction is well-known in the art and need not be illustrated herein.

One of the end links 11 is attached at 16 to the ring shaped member 17 including an opening at 18, and which ring shaped member 17 includes an opening at 19. Received through the opening 18 is a further inner male member 20 including the extending ear 21, the ear 21 normally being positioned adjacently to the ring 17 and at a distance from the opening 19 as shown in Figure 1.

Attached at 22 to the circular member 23, which member 23 is an integral expanded continuation of the member 20, is the extending arm 24, and attached to the arm 24 at 25 is the end link 12 of the cross chain 15. Merging integrally from the member 23 is a further arm 26 to which is attached the further end link 11.

It will now be noted that when the cross chain is attached in place, that the arrangement will appear as shown in Figure 1 and with the elements being in locked position. When it is desired to remove the chain from the tire, the outer end of the cross chain is detached, which allows release of the arm 24 so that it can then be pivoted until the ear 21 can pass through the opening 19 whereby the other end of the inner side wall chain will be released, allowing release of the entire chain.

There is normally sufficient slack in the inner side wall chain to allow of such movement, except of course when the cross chain prevents the same.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A tire chain release device including an inner side chain divided and forming two end portions, a cross chain, and clamp means including a ring member connected to one end portion of the inner side chain having a releasing opening, a stud member to which is attached a link of the other end portion of the side chain, said stud member having an extending ear, and being attached to said cross chain whereby release of the cross chain will provide means for rotating said stud member so that said ear will pass through said receiving opening to release said inner side chain from a tire.

2. A tire chain release device including an inner side chain divided and forming two end portions, a cross chain, and clamp means connected to one end portion of the inner side chain, further clamp means rotatably secured to said clamp means, said further clamp means being attached to a link of the other end portion of the side chain, said cross chain being attached to one of said clamp means, release of said cross chain allowing rotation of said clamp means relative to each other, said clamp means including releasing means whereby said rotation will cause said releasing means to disengage said clamp means from each other whereby said inner side chain will be released from a tire.

MILTON B. HERBRICK.

No references cited.